United States Patent
Forgacs et al.

[15] 3,683,068
[45] Aug. 8, 1972

[54] COMPOSITIONS CONTAINING SCOPULARIOPSIS BREVICAULIS ON AN ALKALINE SUBSTRATE AND THE USE THEREOF IN THE CONTROL OF HEMORRHAGIC SYNDROME IN POULTRY

[72] Inventors: Joseph Forgacs, 302 North Highland Ave., Pearl River, N.Y. 10965; Albert S. Cosgrove, 901 Bayard Avenue, Rehoboth, Del. 19971

[22] Filed: March 10, 1967

[21] Appl. No.: 622,052

[52] U.S. Cl. .................................. 424/93, 195/81
[51] Int. Cl. ........................ A61k 27/00, C12k 1/00
[58] Field of Search ... 167/53.1; 99/4, 2 VM; 195/81; 424/93

[56] References Cited

UNITED STATES PATENTS

| | | | |
|---|---|---|---|
| 3,208,852 | 9/1965 | Forgacs | ............................99/4 |
| 3,255,014 | 6/1966 | Forgacs | ............................99/4 |
| 3,357,884 | 12/1967 | Sarett et al. | .................167/53 |

OTHER PUBLICATIONS

Forgacs, J. et al. Mycotoxicoses, in Avian Diseases, 6 (8) p. 363– 380

Primary Examiner—Sam Rosen
Attorney—Howson and Howson

[57] ABSTRACT

An innocuous and antimycotoxic strain of Scopulariopsis brevicaulis (Sacc.) Bainier carried on a substratum capable of supporting the growth of said fungus, advantageously mixed with a diluent, preferably an alkaline agent or one capable of developing alkalinity, for the prevention or control to a minimum of hemorrhagic syndrome in poultry; and preventing or controlling to a minimum, hemorrhagic syndrome in poultry by seeding litter in a substantially clean poultry house with said composition and permitting growth of the fungus.

7 Claims, No Drawings

COMPOSITIONS CONTAINING SCOPULARIOPSIS BREVICAULIS ON AN ALKALINE SUBSTRATE AND THE USE THEREOF IN THE CONTROL OF HEMORRHAGIC SYNDROME IN POULTRY

BACKGROUND OF THE INVENTION

This invention relates to a composition of matter for use in preventing or controlling mycotoxicosis in poultry, specifically hemorrhagic syndrome, also known as moldy feed toxicosis, aplastic anemia, hemorrhagic-anemic syndrome. The invention also relates to a process by which poultry houses are seeded with an innocuous and antimycotoxic strain of a fungus which, during its growth, creates conditions unfavorable to the growth of toxic fungi and thereby prevents, or controls to a minimum, hemorrhagic syndrome. The invention, therefore, provides an economic means of biologic control of hemorrhagic syndrome.

Hemorrhagic syndrome causes devastating economic effects in poultry raised under field conditions. Losses may incur through a variety of ways, including poor feed conversion, mortality from the toxicosis, mortality from secondary factors directly contributable to a toxic condition present in poultry affected with the hemorrhagic syndrome and by condemnation on the dressing line due to hemorrhages or other pathogenic lesions. In view of magnitude of the broiler business, the control or prevention of hemorrhagic syndrome in broilers as well as in other poultry, would provide a tremendous economic saving. The hemorrhagic syndrome may occur at any time during the growing operation and, in most cases, appears from about the fourth week of a normal broiler operation. The duration of the syndrome in a broiler house is generally about two weeks and thereafter subsides spontaneously, but only after its disastrous effects have occurred. Subsidence in the clinical and pathologic manifestations of the hemorrhagic syndrome coincides with growth of *Scopulariopsis brevicaulis* (Sacc.) Bainier (hereinafter referred to as *Scopulariopsis brevicaulis*) in the litter. Unfortunately, however, during a normal growing operation, the *Scopulariopsis brevicaulis* does not appear as a dominant fungus in the litter, until the later stages of the growing cycle and after the damage resulting from hemorrhagic syndrome has taken place.

SUMMARY OF THE INVENTION

It is, therefore, an object of the present invention to provide a composition of matter to be used in the prevention or control of mycotoxicosis, specifically hemorrhagic syndrome, and thus to provide means of avoiding the disastrous effects on poultry raised under the usual field conditions.

A further object is to provide an economical and efficacious method in which a substantially clean poultry house is seeded with an innocuous and antimycotoxic strain of a fungus which, during its growth, creates conditions unfavorable to the growth of toxic fungi and, therefore, prevents, or controls at a minimum, mycotoxicosis.

A further object of the invention is to provide a method for the production of the composition of matter used in the method above described.

Other objects will be apparent from a consideration of the specification and claims.

The composition of matter of the present invention comprises an innocuous and antimycotoxic strain of *Scopulariopsis brevicaulis* carried on a sterile or substantially sterile substratum capable of supporting the growth of the fungus, advantageously mixed with an essentially fungus-free filler or diluent, preferably an alkaline agent or one capable of developing alkalinity, referred to herein as "an alkaline diluent".

In practicing the method of the invention, the litter in a clean, or substantially clean house, and before the poultry growing operation has commenced, is seeded with the composition described, and the fungus is permitted to proliferate. Since the conditions are favorable for the proliferation of the *Scopulariopsis brevicaulis*, its growth occurs on the litter early and continues throughout the entire broiler operation, thereby preventing the ravages due to the hemorrhagic syndrome. The litter may be any of the materials commonly used, such as shavings, wood chips, sawdust, peanut shells, rice hulls, straw, and the like. The concentration of the fungal substratum on the basis of the litter is not critical since the fungus will proliferate rapidly and may, at the time of application, be as low as 0.1 percent. The upper limit is not critical and is merely governed by economic considerations.

Alkalinity in the litter enhances the growth of the *Scopulariopsis brevicaulis* fungus, and, for this reason, in the preferred composition, an alkaline substance, or one capable of developing alkalinity, is included. Alkalinity also results from the nitrogenous matter in the poultry droppings, giving rise to a relatively high concentration of ammonia in the litter which is deleterious to the growth of most toxigenic fungi. Furthermore, in the event preformed toxins are present in the feed spilled in the litter, the ammonia inactivates mycotoxins, such as the aflatoxins.

The growth of the *Scopulariopsis brevicaulis* fungus creates conditions so that the toxic fungi, including those responsible for hemorrhagic syndrome will not grow. It is believed that should toxic fungi appear in the litter and a toxin be formed, the *Scopulariopsis brevicaulis* fungus uses the toxin as a source of energy in its growth.

The substratum on which the *Scopulariopsis brevicaulis* fungus may be cultured consists of any sterile or substantially sterile material capable of supporting the growth of fungus, for example, whole grain, cracked or ground corn, wheat, oats, rice, soya beans, bran, or the like, preferably in the size range of one-eighth to one-half inch.

As stated, the substratum is inoculated with an innocuous and antimycotic strain of *Scopulariopsis brevicaulis*. Scopulariopsis fungi, including *Scopulariopsis brevicaulis*, are described in "A Manual of the Penicillia" by Kenneth B. Raper and Charles Thom, published by The Williams & Wilkins Company, Baltimore, Md., 1949, pages 694–704. The type of species of *Scopulariopsis brevicaulis* (Sacc.) Bainier is described on pages 697 and 699 and on page 700 is placed in "Group 1" in which group belong the strains of fungus referred to herein. The fungus may be found in soil, stored grain, decaying vegetation, silk, leather, awnings and other fabrics exposed to the weather, and a variety of cheeses, particularly over-ripe Camembert cheese. The *Scopulariopsis brevicaulis* fungus can be separated and isolated from other fungi with which it may be associated by any of the well-known mycologic techniques.

In the preferred composition, the *Scopulariopsis brevicaulis* strains employed are designated GSH—4G—1 and GSH—4G–2. The latter is an adapted strain of the former and its use in the composition is advantageous since good sporulation is obtained in a considerably shorter period of time, for example, on a corn substratum, within seven days as compared to approximately 6 weeks. The following is a description of the morphology of the strains designated GSH—4G–1 and GSH—4G–2:

*Scopulariopsis brevicaulis* (Sacc.) Bainier

Colony on Czapek's solution agar spreads rather broadly, in a thin plane. The color of the colony during the initial stages of growth is grayish-white but rapidly turns buff and then finally yellowish brown. The surface of the colony is characterized by formation of closely crowded conidiophores which appear powdery due to formation of conidia. The conidiophores are mostly 10 to 30 microns in length and arise primarily directly from submerged hyphae. The conidial fructifications are either simple and unbranched to more complex in structure being verticillate and irregularly branched and bearing chains of thick-walled conidia, having a truncate base and a rough surface. Loosely trailing floccose hyphae and ropes of hyphae typically present in the parent strain (GSH—4G–1) are essentially absent in the adapted strain GSH—4G–2.

Strains GSH—4G–1 and GSH—4G–2 have been deposited in the U.S. Department of Agriculture, Fermentation Division of Northern Regional Research Laboratory (NRRL) at Peoria, Illinois, and have received "Accession Numbers" NRRL 3272 and 3273, respectively.

Stock cultures of the fungal strain may be grown for about 6 weeks on a medium capable of supporting the growth of the fungus, for example, a mixture of whole grain corn and scratch grain, followed by drying at about 45° C. and milling. The dried product is maintained in this condition at room temperature for preservation of the strain.

An inoculum may be prepared from the stock culture by plating a portion of the culture on Littman's oxgall agar, followed by a check of the fungal growth for purity. A portion of a typical colony of the pure *Scopulariopsis brevicaulis* strain may then be transferred to an agar slant of Littman's oxgall medium. After two weeks growth, and a check for purity, a portion of the pure fungus on the agar slant may be used for seeding the substratum. Alternatively, a portion of a typical colony of pure *Scopulariopsis brevicaulis* strain may be introduced into a liquid medium consisting of Czapek's solution broth, fortified with orange juice. After two weeks growth, purity of the fungus is determined and a portion of the pure fungus in the broth may be used for seeding the substratum.

It will be understood that other methods than those described above may be employed in making the stock culture and the inoculum.

As stated, the composition of the invention is prepared by growing the fungus on any sterile or essentially sterile substratum capable of supporting its growth and various conditions may be employed in preparing the substratum for receipt of the fungus and in the inoculation and culturing of the fungus on the substratum.

DESCRIPTION OF THE PREFERRED EMBODIMENTS

The following is a specific example using corn as the substratum. Coarse cracked corn, preferably of a size between one-eighth and one-half inch, is washed with a stream of water to remove particulate matter, debris, and immature and diseased kernels. The corn is then steeped in warm water for approximately 4 hours, after which the corn is drained. Approximately two pounds of the steeped corn are added to a 2,800 milliliter Fernbach flask. The flask is stoppered with a cotton plug and the exterior surface of the plug projecting from the flask is wrapped with ordinary wrapping paper and tied with a string. The contents of the flask are sterilized by autoclaving in steam at fifteen pounds pressure for one and one-half hours and then cooled as rapidly as possible to approximately room temperature (about 24° C.), for example, by running cold water over the flask. This rapid cooling of the corn substrate is important since it prevents the germination of thermophyllic bacterial spores which are not destroyed by the autoclaving step, and which can germinate and vegetate if rapid cooling of the autoclaved substratum is not carried out. The pH of the substratum is not critical but is preferably alkaline, for example, a pH of 7 to 9.5, adjusted by the addition of ammonium hydroxide, if desired.

In a specific example for the inoculation and culturing of the substratum, the contents of the flask containing the substratum prepared as above described is inoculated aseptically with a pure culture of the *Scopulariopsis brevicaulis*, for example, with a portion of the well-sporulated slant or, preferably with a few milliliters of the liquid broth, both of which have been described above. After inoculation, the contents of the flask are shaken to distribute the fungus inoculum over the corn substratum. Thereafter, the contents of the flask are shaken twice daily to prevent clumping of the corn and also to stimulate aerial growth of the *Scopulariopsis brevicaulis* fungus. The temperature used in the culturing of the fungus is not critical and room temperatures (about 24° C.) are usually employed, but the fungus can be grown at temperatures of about 37° C. or higher, if desired. When good sporulation has occurred on all grains of corn, the contents are removed, dried at temperatures ranging from about 40° to 55° C. and then milled to a fine powder, using any suitable means for grinding, such as hammer mill or a Wiley mill. Drying temperatures not exceeding about 55° C. should be used and the dried product is ground to provide particles, for example, from about 0.5 millimeters to not over about 2 millimeters in size. In the ground product, the fungus can be observed as a buff powder. With strain GSH—4G–1, good sporulation occurs after about six weeks, whereas strain GSH—4G–2 will sporulate well within about seven days.

The substratum with which the cultured fungus is associated may be applied without dilution to the litter in the poultry house but this is uneconomical and further difficulties may be encountered in distributing the product over the litter. For these reasons, it is advantageous to dilute the product prior to application to the litter by mixing therewith a powdered diluent which is essentially fungus-free. The mixture of substratum, fungus, and inert material is usually in the form of a dust or powder so that the fungus will be evenly distributed on the litter and so that the usual hand or mechanical dusting equipment can be used in applying the composition. While an inert diluent such as fuller's or diatomaceous earth may be used, it is preferred to use, as the diluent, an alkaline material or a material capable of liberating an alkaline material, for example, calcium carbonate or bicarbonate, magnesium carbonate or bicarbonate or sodium carbonate or bicarbonate. Of the available materials, finely divided calcium carbonate is preferred. As stated, the presence of the alkaline material favors the further growth of the fungus on the litter. The amount of diluent present may vary over a wide range and depends primarily on economic considerations. For example, the amount of the substratum and fungus with respect to the diluent may be relatively small, for example, 0.1 percent to 5.0 percent or more. In a typical case, a mixture comprising one pound of the substratum and fungus and 99 pounds of calcium carbonate has been found to be satisfactory.

As stated above, the fungus-containing composition, whether or not it contains the diluent, is applied to a clean, or essentially clean, poultry house containing fresh litter. The application can be made at any time before the chickens or other poultry are placed in the house. Preferably, however, the composition is applied to the litter several days, for example, 3 days before the chickens are to come into contact with the litter, since this gives time for the fungus to proliferate on the litter. The composition may be applied to the litter in any amount desired. In a typical case, using the mixture containing 1 pound of the fungus-containing substratum and 99 pounds of calcium carbonate, the composition was applied by a hand duster to provide about 1 pound of the composition for each 2000 square feet.

There is generally sufficient moisture in the air and litter for the proliferation of the fungus but, if desired, a small amount of moisture may be applied to the litter.

While the invention has been described with specific embodiments, it is to be understood that it is not limited thereto, but is to be construed broadly and limited solely by the scope of the appended claims.

We claim:

1. A composition of matter for controlling hemorrhagic syndrome in poultry comprising an innocuous and antimycotoxic strain of *Scopulariopsis brevicaulis* (Sacc.) Bainier, distributed in a substantially sterile substratum capable of supporting the growth of said fungus in combination with a finely-divided, substantially fungus-free alkaline diluent, the fungus and substratum being present in the diluent in an amount up to 5 percent by weight.

2. The composition of claim 1 wherein the strain of *Scopulariopsis brevicaulis* (Sacc.) Bainier is selected from the group consisting of GSH—4G–1 and GSH—4G–2.

3. The composition of claim 2 wherein the substratum is corn.

4. The composition of claim 2 wherein the strain of *Scopulariopsis brevicaulis* (Sacc.) Bainier is GSH—4G–2.

5. The composition of claim 4 wherein the substratum is corn.

6. The method of controlling hemorrhagic syndrome in poultry which comprises applying at least about 0.1 percent of the composition of claim 1, in a dry, finely divided form, to litter in a substantially clean poultry house and permitting the fungus to proliferate.

7. The method of controlling hemorrhagic syndrome in poultry which comprises applying at least about 0.1 percent of the composition of claim 2, in a dry, finely divided form, to litter in a substantially clean poultry house and permitting the fungus to proliferate.

* * * * *